United States Patent
Aebersold et al.

(10) Patent No.: US 8,542,116 B2
(45) Date of Patent: Sep. 24, 2013

(54) HAZARD ALARM WITH A VARIABLE HOLDING REGION FOR A SUPPLY ELEMENT

(75) Inventors: Hans Aebersold, Bonstetten (CH); Wolf Liebert, Kirchdorf (CH); Matthias Nyikos, Zug (CH)

(73) Assignee: Siemens Aktiengesellschaft, Munich (DE)

( * ) Notice: Subject to any disclaimer, the term of this patent is extended or adjusted under 35 U.S.C. 154(b) by 367 days.

(21) Appl. No.: 12/934,782

(22) PCT Filed: Mar. 26, 2008

(86) PCT No.: PCT/EP2008/053512
§ 371 (c)(1),
(2), (4) Date: Nov. 1, 2010

(87) PCT Pub. No.: WO2009/118040
PCT Pub. Date: Oct. 1, 2009

(65) Prior Publication Data
US 2011/0043361 A1     Feb. 24, 2011

(51) Int. Cl.
*G08B 21/00*     (2006.01)
(52) U.S. Cl.
USPC ............... 340/540; 340/425.5; 340/426.1; 340/630
(58) Field of Classification Search
USPC ......... 340/540, 425.5, 426.1, 426.22, 426.23, 340/438, 442, 443, 514, 628, 630
See application file for complete search history.

(56) References Cited

U.S. PATENT DOCUMENTS

| | | | | |
|---|---|---|---|---|
| 4,371,594 A * | 2/1983 | Ohara et al. | | 429/97 |
| 4,965,141 A * | 10/1990 | Suzuki | | 429/9 |
| 5,290,639 A * | 3/1994 | Mallory | | 429/1 |
| 5,355,026 A * | 10/1994 | Scofield | | 307/117 |
| 5,461,367 A * | 10/1995 | Altavela et al. | | 340/584 |
| 5,497,144 A * | 3/1996 | Schappi et al. | | 340/630 |
| 5,659,136 A * | 8/1997 | Koch et al. | | 73/462 |
| 6,125,759 A * | 10/2000 | Epps | | 101/484 |
| 6,516,012 B2 * | 2/2003 | Kleinschmidt et al. | | 372/29.01 |
| 2005/0110631 A1 * | 5/2005 | Siber et al. | | 340/514 |

FOREIGN PATENT DOCUMENTS

| | | |
|---|---|---|
| DE | 202005016596 U1 | 3/2007 |
| GB | 2263810 A | 8/1993 |
| JP | 2007324032 A | 12/2007 |

* cited by examiner

*Primary Examiner* — Daniel Previl
(74) *Attorney, Agent, or Firm* — Laurence A. Greenberg; Werner H. Stemer; Ralph E. Locher

(57) ABSTRACT

A danger sensor (100) is described which features a first housing part (110), a second housing part (120), a detector unit (112) for detecting of a danger situation, wherein the detector unit (112) is arranged in or at the first housing part (110), and an electrical connection (114*a*, 114*b*) for connecting of at least one supply element (142*a*, 142*b*) which provides electric power to the detector unit (112) during operation. The first housing part (110) together with the second housing part (110) is designed so that a holding area is present between the two housing parts (110, 120) for the at least one supply element (142*a*, 142*b*), and that the volume of the holding area is variable by means of a volume adjustment element (130). Furthermore, an element (130) is described for adapting a danger sensor to different requirements regarding the power supply; also described is an arrangement for detecting of a danger situation and a method for retrofitting of the power supply to a danger sensor (100).

14 Claims, 1 Drawing Sheet

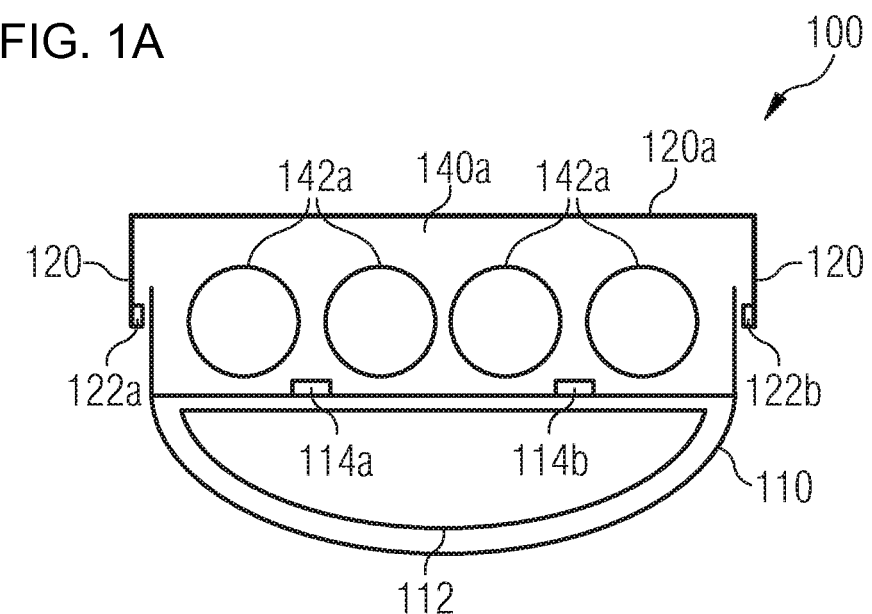
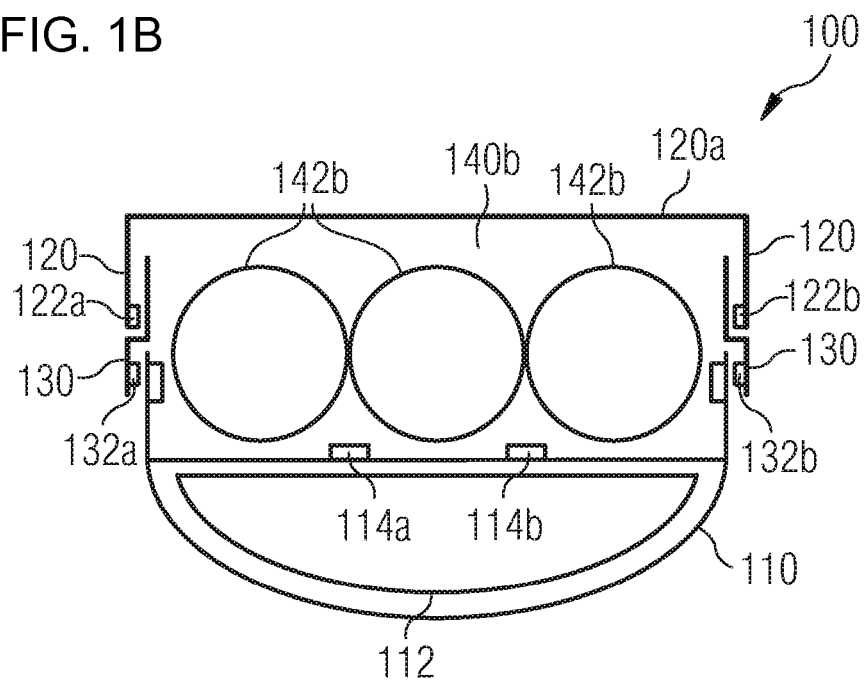

HAZARD ALARM WITH A VARIABLE HOLDING REGION FOR A SUPPLY ELEMENT

BACKGROUND OF THE INVENTION

Field of the Invention

The present invention relates to the technical field of hazard alarm technology. The present invention relates in particular to a hazard alarm operated by a supply element, such as a battery for example. The present invention further relates to an element for tailoring a hazard alarm to different requirements relating to the power supply. The present invention also relates to an arrangement for detecting a hazard situation and a method for retrofitting the power supply of a hazard alarm.

As well as fire alarms that are supplied with electrical energy by way of a power cable, there are also fire alarms that are operated with one or a number of batteries. This is the case particularly when fire alarms are connected to a central fire unit by way of a wireless communication connection.

The service life of a battery or battery pack containing a number of batteries is however generally extremely dependent on the quality of the respective radio link. Professional fire alarms transmit a signal to the central fire unit at regular intervals of for example 3 seconds by way of the radio link, said signal indicating to the central fire unit that the fire alarm is operational but there is currently no hazard situation.

Because of different radio links in particular it is however not unusual for the battery service life to be much shorter than the normal service interval, in which the fire alarms in question are checked for example for dirt and dust that is so significant that it can no longer be compensated for by the signal evaluation algorithm of the respective fire alarm. It is therefore expedient to supply fire alarms with different battery packs, each having a different capacity.

In the case of fire alarms there is a desire for example for aesthetic reasons to utilize the smallest possible mounting space and for financial reasons to use the most favorable (i.e. small) batteries possible. The fire alarm is therefore constructed on the basis of the smallest battery pack for minimum battery service life to comply with the relevant standard EN54-25 for battery-operated fire alarms. Other batteries must be used for a longer service life with longer battery replacement intervals. These are generally batteries with a greater volume.

Known battery-operated fire alarms are only supplied with one type and size of battery for cost reasons. A compromise is generally reached here between the required mounting space, costs and battery size or battery service life.

BRIEF SUMMARY OF THE INVENTION

The object of the invention is to improve the power supply to a battery-operated hazard alarm so that batteries of different sizes can be used simply and effectively without thereby reducing the compactness of the spatial dimensions of the hazard alarm unnecessarily.

This object is achieved by the subject matter of the independent claims. Advantageous embodiments of the present invention are described in the dependent claims.

A hazard alarm is described according to a first aspect of the invention. The hazard alarm features (a) a first housing part, (b) a second housing part, (c) a detector unit for detecting a hazard situation, the detector unit being disposed in or on the first housing part, (d) an electrical connection for connecting at least one supply element, which supplies the detector unit with electrical energy during operation. The first housing part together with the second housing part is configured so that a holding region for the at least one supply element is present between the two housing parts and the volume of the holding region can be changed by means of a volume adjustment element.

The described hazard alarm is based on the knowledge that the specific embodiment of the two housing parts in particular in the sub-regions, which face one another when the hazard alarm is assembled, means that the volume of the holding region can be tailored specifically to the supply element in current use by using a suitably configured or shaped volume adjustment element. This allows the same hazard alarm to be operated with supply elements of different sizes.

The volume adjustment element can be an insert for example, which can be introduced into the holding region so that the effectively usable volume of the holding region is specifically reduced. This allows the freedom of movement of one or more supply elements, which are smaller than the holding region, to be specifically restricted and prevents unintended and uncontrolled movement of the supply element(s) within the holding region.

The supply element can be a disposable battery or a rechargeable battery, for example an accumulator. A number of supply elements can also be combined to form a pack of supply elements, which are all housed in the holding region.

It should be noted that in the case of a fire alarm there may be statutory provisions such as the standard EN54-25 for example, which prohibit the use of a rechargeable battery.

The possibility of using supply elements of different sizes with the same hazard alarm allows power supplies of different yields to be implemented simply and effectively for battery-operated hazard alarms. The actual detector unit and the two housing parts can be used here for all types of supply elements without adaptation. The volume adjustment element can be of different size or height depending on the type and size of the supply element(s). Therefore the same hazard alarm can be equipped with an optimally tailored holding region as far as size is concerned for any areas of hazard alarm technology, without major outlay in respect of (a) the desired battery replacement intervals, (b) the available and/or desired mounting space and (c) production costs.

According to a further exemplary embodiment of the invention the volume adjustment element is an intermediate element, which can be introduced between the first housing part and the second housing part.

The intermediate element can also be referred to as a mechanical adaptor which can be inserted as required between the two housing parts so that the space in the holding region can be extended as appropriate. This has the advantage that the same hazard alarm can be operated in each instance with supply elements of different sizes in one spatially compact embodiment.

The described hazard alarm can thus be operated with different supply elements, with an appropriate volume being set in each instance for the holding region. The hazard alarm can thus be operated with different supply elements, in each instance in a spatially particularly compact form, thereby effectively avoiding unnecessary hollow spaces in the holding region.

The housing of the described hazard alarm with the two housing parts can thus be designed for a predetermined smallest supply element or for a smallest pack of supply elements with a minimum battery service life, as required to comply with the relevant statutory provision for battery-operated fire alarms, i.e. the standard EN54-25. If the customer or operator of the hazard alarm desires a longer supply element service life, the hazard alarm can be operated with correspondingly larger supply elements. So that the larger supply element(s) fit(s) into the same holding region, the described intermediate element is inserted between the two housing parts. This allows the holding region to be extended appropriately as a function of the size of the intermediate element depending on the supply element(s) to be used.

According to a further exemplary embodiment of the invention the two housing parts are further configured so that the second housing part can be connected directly to the first housing part. This has the advantage that the described hazard alarm can also be operated without an intermediate element. The two housing parts here are expediently configured in such a manner that the holding region formed without an intermediate element is tailored precisely to the smallest supply element typically used.

According to a further exemplary embodiment of the invention the first housing part and/or the second housing part are fitted with a quick release fastener.

The use of a quick release fastener, which can be configured for example as a bayonet fastener, has the advantage that the two housing parts can be connected to one another simply and quickly. Also the intermediate element described above can be configured in a similar manner, so that after the at least one supply element has been replaced, the size of the holding region can be tailored quickly to the size of the at least one supply element to be used and the hazard alarm as a whole can be put together rapidly with few hand movements.

The quick release fastener is preferably configured and disposed on the first housing part and/or the second housing part so that the detector unit together with the at least one supply element can be removed from a socket by means of a special holding mechanism, which can be attached to a rod for example, said socket generally being located on the ceiling of a space to be monitored. The same of course also applies to the insertion of the detector unit together with the supply element into a suitable holding socket. The use of a rod here has the advantage that a ladder does not have to be provided for the corresponding operator to replace the detector unit and/or the at least one supply element. The detector unit together with the supply element can be suspended or removed for example by means of a suitable rotational movement.

According to a further exemplary embodiment of the invention the detector unit is also set up to detect an at least indirect mechanical connection between the two housing parts. This has the advantage that operation of the hazard alarm without the second housing part can be excluded and/or that, when the second housing part is removed, a corresponding alarm or warning message can be output, at least during a specified time period that significantly exceeds the time required for a normal battery change.

In a fire alarm system, in which the hazard alarm is connected to a central unit by way of radio, it is thus possible effectively to prevent a user intentionally or negligently removing the detector unit from the second housing part, which is fixed to the ceiling of a space to be monitored, and moving the detector unit into a region of the space, in which no smoke occurs or smoke only occurs after a significant delay in the event of a fire. Such a region is for example a closed drawer, into which little smoke will penetrate in the event of a fire. In such an instance the detector unit would send a signal to the central fire alarm system unit at regular intervals, which would indicate an absence of smoke to the central unit, even if smoke had actually already penetrated into the space but not (yet) into the smoke-free region of the space.

According to a further exemplary embodiment of the invention the electrical connection is disposed in or on the first housing part. This has the advantage that all the electrical components of the described hazard alarm can only be disposed in or on the first housing part. The second housing part can then be produced in a simple manner or by means of a simple injection molding operation. Further production processes are then not necessarily required for the second housing part.

According to a further exemplary embodiment of the invention the second housing part is a retaining element, which is configured so that it can be attached to a wall and in particular to a ceiling of a space to be monitored.

The retaining element can be for example a socket of the hazard alarm. Holes can also be provided on the retaining element so that the retaining element can be attached for example by means of screws in particular to the ceiling of the space to be monitored.

According to a further exemplary embodiment of the invention the detector unit is set up (a) to detect smoke, (b) to detect temperature changes, (c) to detect at least one gas, (d) to detect at least one fluid, and/or (e) to detect persons or objects entering a monitored space without permission. This has the advantage that the described hazard alarm can be used to identify different types of hazard situations. The detector unit can in each instance be fitted in an appropriate manner with corresponding optical and/or chemical detection systems. In the case of a smoke alarm, which is the most frequently used hazard alarm, the principle of scattered light measurement at smoke particles can be used in the known manner for reliable smoke and/or fire detection.

According to a further exemplary embodiment of the invention the detector unit features a microprocessor, which is programmed in such a manner that the hazard alarm can be operated with a standard configuration independently of the use of an intermediate element and/or independently of the height of an inserted intermediate element.

The hazard alarm can thus be modified by anyone, without specific knowledge being required with regard to the changing of parameter values, which for example determine the sensitivity of the hazard alarm for triggering a hazard message. In the case of a smoke alarm in particular the sensitivity, which is generally set by way of parameters of an evaluation algorithm, can be a function of the distance of the detector unit from the ceiling of a space to be monitored. This is because in the event of a fire the smoke from a smoke source, which is generally on the ground or at least in a region close to the ground, does not spread to directly below the ceiling. Instead there is an air cushion directly below the ceiling, which is not penetrated by smoke for some time at least. Therefore the sensitivity to be set for known smoke alarms is quite significantly a function of the respective distance between the detector unit and the ceiling of the space.

With the described hazard alarm the programming of the microprocessor is selected by a suitable selection of parameter values so that even when the structural height changes, as can result from the use of different intermediate elements, the threshold for triggering a hazard message does not have to be tailored to the new structural height or the new distance between the detector unit and the ceiling of the space to be monitored. Of course this means that the corresponding parameter values used for the described hazard alarm represent a compromise between optimum sensitivity and a simple ability to change the size of the holding region for some structural heights at least.

According to a further aspect of the invention a volume adjustment element is described for a hazard alarm of the type described above. The volume adjustment element features (a) a first interface, which is configured so that the volume adjustment element can be connected mechanically to the first housing part, and/or (b) a second interface, which is configured so that the volume adjustment element can be connected mechanically to the second housing part.

The described volume adjustment element is based on the knowledge that the volume of the holding region can be tailored specifically to the supply element in current use. The volume adjustment element can for example specifically reduce the effectively usable volume of the holding region so that unintended and uncontrolled movement of at least one supply element, which is smaller than the holding region, is prevented within the holding region. It is possible thus to insure for example that a supply element inserted into the holding region always remains in contact with corresponding contacts of the electrical connection.

According to one exemplary embodiment of the invention the volume adjustment element is an intermediate element, which can be connected mechanically to the first housing part and the second housing part.

The intermediate element can be inserted for example between the two housing parts, so that the holding region is only enlarged when required, for example when using at least one larger supply element. This allows the same hazard alarm to be operated with supply elements of different sizes in each instance in one spatially compact embodiment.

According to a further exemplary embodiment of the invention the intermediate element is configured as an intermediate ring. This has the advantage that the intermediate element can be used for many already known hazard alarms and also for many hazard alarms with a circular frame that are already available on the market. The diameter and shape of the intermediate ring here are tailored to the respective housing parts of already known hazard alarms.

According to a further exemplary embodiment of the invention the intermediate element features a quick release fastener.

The use of a quick release fastener on the intermediate element has the advantage that the two housing parts can be coupled to the intermediate element simply and quickly. It is thus possible after replacing the at least one supply element to tailor the size of the holding region quickly to the size of the at least one supply element for subsequent use and the hazard alarm as a whole can be put together simply.

The quick release fastener on the intermediate element can also be configured for example as a bayonet fastener. This has the advantage that a reliable mechanical connection can be established between the intermediate element and the respective housing part by means of a simple rotational movement.

It should be noted that any other mechanical fasteners can of course also be used to connect the intermediate element to the two housing parts.

According to a further aspect of the invention an arrangement for detecting a hazard situation is described. The arrangement features (a) a hazard alarm of the type described above and (b) a volume adjustment element of the type described above. The volume adjustment element is configured so that it can be coupled to the first housing part and/or to the second housing part, so that the volume of the holding region can be changed.

The described arrangement for detecting a hazard situation can also be fitted or supplied and sold with a number of volume adjustment elements of different sizes. This has the advantage that a customer can create holding compartments of different sizes as a function of the respectively desired field of application, simply by using the appropriate volume adjustment element.

The volume adjustment element can be a simple mechanical object, which can be produced particularly economically by means of an injection molding method for example. It is thus feasible in respect of the additional costs to supply a hazard alarm as standard in an arrangement having one or a number of volume adjustment elements suitable for supply elements of different sizes.

According to a further aspect of the invention a method is specified for retrofitting a hazard alarm of the type described above with a volume adjustment element of the type described above. With the specified retrofitting method the volume adjustment element is coupled to the first housing part and/or to the second housing part, so that the volume of the holding region is changed.

The described method is also based on the knowledge that the volume of the holding region can be tailored specifically to the supply element in current use by using an appropriately embodied volume adjustment element.

Further advantages and features of the present invention will emerge from the exemplary description which follows of a currently preferred embodiment.

BRIEF DESCRIPTION OF THE SEVERAL VIEWS OF THE DRAWING

FIG. 1a shows a fire alarm having a first battery pack, which is located in a holding region formed by two housing parts.

FIG. 1b shows the fire alarm illustrated in FIG. 1, wherein the volume of the holding region has been enlarged by means of an intermediate element.

It should be noted here that in the drawing the reference characters of identical or corresponding components only differ by an appended letter.

DESCRIPTION OF THE INVENTION

The two FIGS. 1a and 1b show a hazard alarm 100 configured as a fire alarm. In FIG. 1a the fire alarm 100 is illustrated with a conventional holding region 140a, which is provided to hold a total of four supply elements 142a. According to the exemplary embodiment illustrated here the supply elements are batteries 142a. In FIG. 1b the fire alarm 100 is illustrated with an enlarged holding region 140b, which is provided to hold a total of three supply elements 142a likewise configured as batteries.

As can be seen directly by comparing the two FIGS. 1a and 1b, the three batteries 142b are substantially larger than the four batteries 142a. The capacity of the three batteries 142b is also greater than the capacity of the four batteries 142a, so the battery replacement intervals of the fire alarm illustrated in FIG. 1b are much longer than the battery replacement intervals of the fire alarm illustrated in FIG. 1a. This is so at least for otherwise identical operating conditions such as in particular the frequency with which the alarm is triggered and/or the quality of the radio link to a central fire alarm unit (not shown).

The holding region 140a of the fire alarm 100 illustrated in FIG. 1a is defined by two housing parts, a first housing part 110 and a second housing part 120. The enlarged holding region 140b of the fire alarm 100 illustrated in FIG. 1b is defined by the two housing parts 110 and 120 and additionally by an intermediate element 130, which is introduced between the two housing parts 110 and 120. According to the exemplary embodiment illustrated here the shape of the intermediate element 130 is tailored to the circular shape (not clearly shown in FIGS. 1*a* and 1*b*) of the hazard alarm 100, so that the intermediate element is an intermediate ring 130 or an at least approximately circular adaptor 130. It should be noted that the term "circular shape" relates to a plane perpendicular to the plane of the drawing and parallel to the surface 120*a* of the second housing part 120.

According to the exemplary embodiment illustrated here a detector unit 112 is disposed within the first housing part 110. The detector unit 112 can be any measuring unit for detecting hazard situations. According to the exemplary embodiment illustrated here the detector unit 112 features an optical scattered light sensor, which determines the presence of smoke by means of scattered light, said scattered light resulting from the scattering of measuring light at smoke particles and generally being detected by a light receiver configured as a photo diode.

To supply the detector unit 112 with electrical energy an electrical connection is also provided on the first housing part 110 and according to the exemplary embodiment illustrated here comprises two connection contacts 114*a* and 114*b*. The two connection contacts 114*a* and 114*b* form an electrical contact with contacts (not illustrated) of the batteries 142*a* and 142*b* inserted into the holding compartment 140*a* or 140*b*.

According to the exemplary embodiment illustrated here the second housing part 120 is a support or socket 120, which can be attached in a fixed manner to the ceiling or wall of a space to be monitored. Securing to the ceiling or wall can be effected by means of screws for example. To this end the upper face 120*a* of the second housing part 120 can be equipped with suitable holes, through which the corresponding securing screws can be passed.

As shown in FIG. 1*a* a quick release fastener is provided on the second housing part 120, comprising two engaging elements 122*a* and 122*b*. The engaging elements 122*a* and 122*b* can engage in two openings configured in an appropriate manner and in an appropriate place on the first housing part 110. These openings are not illustrated in FIGS. 1*a* and 1*b* for reasons of clarity.

According to the exemplary embodiment illustrated here the quick release fastener is a bayonet fastener for example, so the two housing parts 110 and 120 can be connected to one another simply and quickly. Of course the engaging elements can also be disposed on the second housing part 120 and the openings (not illustrated) can also be disposed on the first housing part 110.

As shown in FIG. 1*b* a quick release fastener is also provided on the intermediate element 130, comprising two engaging elements 132*a* and 132*b*. The engaging elements 132*a* and 132*b*, like the engaging elements 122*a* and 122*b*, can engage in the openings configured on the first housing part. Two openings are further provided on the intermediate element 130, in which the engaging elements 122*a* and 122*b* configured on or attached to the second housing part 120 can engage. Where the intermediate element 130 is used to produce the enlarged holding region 140*b* the two housing parts 110 and 120 are thus connected indirectly by way of the intermediate element 130 by means of two quick release fasteners.

It should be noted that the embodiment described here only represents a limited selection of possible variants of the invention.

The invention claimed is:

1. A hazard alarm, comprising:
   a first housing part;
   a detector unit disposed in or on said first housing part, said detector unit being configured for detecting a hazard situation;
   an electrical connection for connecting at least one supply element to said detector unit for supplying said detector unit with electrical energy during operation;
   a second housing part mounted to said first housing part, said first and second housing parts together defining a holding region therebetween for accommodating the at least one supply element; and
   a volume adjustment element for adjusting a volume of said holding region formed by said first and second housing parts, said volume adjustment element being an intermediate element configured to be introduced between said first housing part and said second housing part, said intermediate element being an intermediate ring.

2. The hazard alarm according to claim 1, wherein said first and second housing parts are configured such that said second housing part is connectable directly to said first housing part.

3. The hazard alarm according to claim 2, wherein one or both of said first housing part and said second housing part is or are fitted with a quick release fastener.

4. The hazard alarm according to claim 1, wherein said detector unit is configured to detect whether or not said first and second housing parts are at least indirectly mechanically connected.

5. The hazard alarm according to claim 1, wherein said electrical connection is disposed in or on said first housing part.

6. The hazard alarm according to claim 1, wherein said second housing part is a retaining element configured for attachment to a wall of a space to be monitored.

7. The hazard alarm according to claim 1, wherein said second housing part is a ceiling-mountable retaining element configured for attachment to a ceiling of a space to be monitored.

8. The hazard alarm according to claim 1, wherein said detector unit is configured to detect at least one hazard selected from the group consisting of:
   smoke;
   temperature changes;
   at least one gas;
   at least one fluid; and
   a presence of persons or objects entering a monitored space without permission.

9. The hazard alarm according to claim 1, wherein said detector unit includes a microprocessor programmed to enable an operation of the hazard alarm with a standard configuration:
   independently of a presence of said intermediate element; and/or
   independently of a height of said intermediate element inserted between said first and second housing parts.

10. In combination with a hazard alarm according to claim 1, a volume adjustment element, comprising:
   a first interface configured to enable the volume adjustment element to be mechanically connected to the first housing part of the hazard alarm; and/or
   a second interface configured to enable the volume adjustment element to be mechanically connected to the second housing part of the hazard alarm.

11. The volume adjustment element according to claim 10, wherein the intermediate element is to be connected mechanically to the first housing part and to the second housing part.

12. The volume adjustment element according to claim 11, wherein the volume adjustment element comprises a quick release fastener.

13. A retrofitting method, comprising:
   providing a hazard alarm according to claim 1;
   providing a volume adjustment element and coupling the volume adjustment element to the first housing part of the hazard alarm and/or to the second housing part of the hazard alarm, to thereby change a volume of the holding region for the one or more supply elements.

14. The hazard alarm according to claim 1, wherein said volume adjustment element provides for different holding volumes of said holding region with said first and second housing parts positioned for holding the at least one power supply during operation.

* * * * *